Sept. 12, 1967          W. J. ROZMUS          3,340,596
COLD PRESSURE WELDING OF WIRES AND THE LIKE
Filed Sept. 11, 1964          2 Sheets-Sheet 1
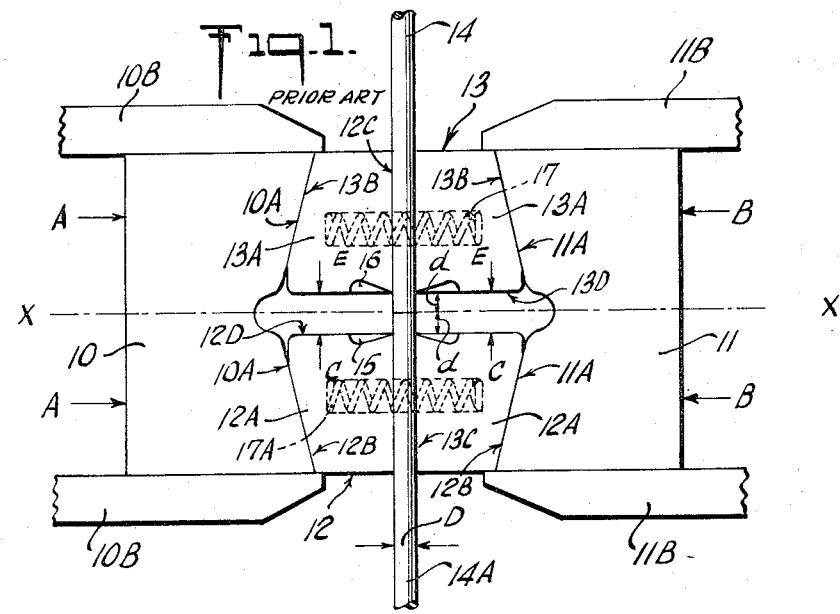
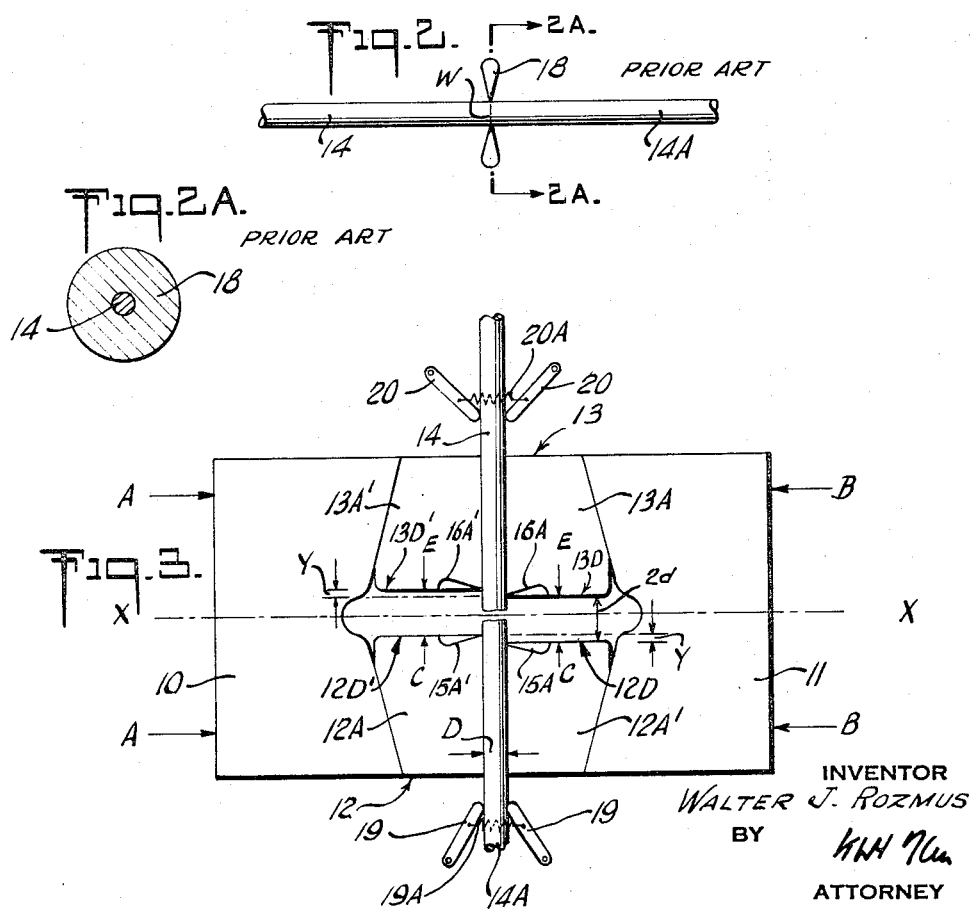
INVENTOR
WALTER J. ROZMUS
BY
ATTORNEY

INVENTOR
WALTER J. ROZMUS
BY
ATTORNEY

United States Patent Office 3,340,596
Patented Sept. 12, 1967

3,340,596
COLD PRESSURE WELDING OF WIRES AND THE LIKE
Walter J. Rozmus, Hubbardsville, N.Y., assignor to Kelsey-Hayes Company, Romulus, Mich., a corporation of Delaware
Filed Sept. 11, 1964, Ser. No. 395,833
13 Claims. (Cl. 29—470.1)

ABSTRACT OF THE DISCLOSURE

In the cold pressure butt welding of wires by upsetting the abutting wire ends to be joined, the normally closed ring-shaped welding flash, extending radially outwardly from the weld joint and requiring a separate cutting operation of the ring for ready removal thereof, is split during the welding operation proper into two separate radial and easily removable parts by diverting the normally radial metal flow into two partial flows each being in part radial and in part axial in one of the opposite directions from the initial weld joint. Practically, this result is obtained by the use of a pair of conventional split die members having axial cavities for the holding of the wires with the split halves of each die member being staggered relative to one another in the axial direction such that the members interengage one another in the closed position upon welding.

---

The present invention relates to the cold pressure welding of wires, rods, and the like attenuated members or workpieces, or the welding together in a butt joint of such members consisting of aluminum, copper, or the like ductile and cold pressure weldable metals or metal alloys, by pressure only applied to the butted members and substantially without the use of extraneous welding heat.

While in the following reference will be had to and the invention described, by way of example, in conjunction with the welding of wires, the term as used for the purpose of this specification and claims is understood to include equivalent elements or workpieces, such as rods, bars or the like members of either round, square or any other cross-section.

There is already described in U.S. Patent No. 2,698,458, issued Jan. 4, 1955, a method or technique of cold pressure welding in a butt joint two attenuated elements, such as wires, of cold pressure weldable material, said method comprising holding or containing, by means of suitable gripping or clamping dies, each of a pair of wires to be welded close to but not right up to the end which is to be jointed to the other wire, in such a manner as to prevent crumbling or bending of the wires, on the one hand, but to allow of upsetting of the butted ends thereof, to create a lateral metal flow of the material at the inter-face, on the other hand. As a consequence, forcing of the wires together by continued pressure applied across the butted end faces, or through the wires themselves, will result in the material of both wires to flow laterally outwardly and, in so doing, to effectively weld the wires together in a solid-phase joint or welding bond.

A prerequisite in joining two members by cold pressure welding, or by the action of an intense interfacial metal flow at the mating or interfacial surfaces to be joined, is the preparation or cleaning of the areas of contact to be joined, to remove oxide or other surface contamination impeding or preventing welding. An effective method of cleaning has been found by scratchbrush treatment of the surfaces, or by cutting or sawing of the wires at right angle by the aid of a suitable cutting device or tool, whereby to provide exposed substantially pure metallic surfaces engaging one another prior to the upsetting or welding pressure application. The cutting device may advantageously serve as a means for setting the projecting length of the wires from the clamping jaws or dies as shown and described in greater detail in U.S. Patent No. 2,774,262, issued Dec. 18, 1956.

In the butt welding of wires by pressure as referred to, upsetting of the butted ends of the wires must be carefully controlled in order to create the requisite interfacial cold metal flow conducive to welding of the wires in a solid-phase weld or bond. For practical purposes, upsetting or reduction of the butted ends of the wires, projecting initially from the dies or gripping jaws by a length of the order of the diameter of the wires, to about one fourth of the total projecting length of the wires has been found to produce satisfactory results, as described in further detail in Patent No. 2,698,458. The displaced metal appears in the form of a closed or ring-shaped welding flash projecting radially from the periphery of the interface or circular weld area which is substantially at right angles to the wire axis. Control of the extent of the upsetting may be effected by the provision of suitable stop or abutment means designed to limit the displacement of the pressure tools or gripping dies. An especially advantageous tool construction is obtained by utilizing the gripping dies themselves as abutments to limit the upsetting by the provision in the opposed die faces adjoining the points of emergence of the wires of recesses or cavities adapted to accommodate the displaced metal during welding and determining the shape of the flash in the final abutting or welding position of the dies. According to a preferred design, the depth of the recesses or cavities increases from zero outwardly from the edge of the bores in the dies provided for holding the wires, whereby to produce a ring-shaped welding flash of substantially triangular cross-section which can be easily and instantly severed from the welded wires.

In the further development of the art of joining wires or the like by cold pressure welding, it has been found that the joint obtained can be improved considerably by the use of a multiple upsetting technique, that is, by opening, retracting and re-grasping the wires after a first upset, or the carrying out of a number of repeated upsetting operations, in the manner described in greater detail in U.S. Patent No. 3,106,013, issued on Oct. 8, 1963, and assigned to the same assignee as the instant application.

By the use of such a multiple upset technique it has been found that pre-cleaning of the wires may be dispensed with entirely, provided a sufficient number of upsets or welding operations is used, to result in a flash of progressively increasing size to be finally removed to provide a smooth welding joint. More particularly, as a result of the repeated upsets, the initial contamination of the wires or the impurities present at the interface will be swept or conveyed progressively into the flash by the displaced metal until obtaining a satisfactory solid-phase bond at the completion of a predetermined number of multiple upsetting operations.

In the welding of wires in the manner described, considerable upset pressure is required to continuously displace the metal from the interface outwardly in all directions and into the ring-shaped flash being formed during welding. The flash being closed upon itself offers an ever increasing resistance to the metal flow in the absence of a unilateral escape or outlet path for the metal being displaced. These conditions assume an especially serious nature in the case of multiple upsetting as a result of the progressively expanding flash and increasing resistance to the metal flow from the inside to the outside of the wires.

Accordingly, an important object of the present invention is the provision of an improved method or technique of cold pressure welding wires or the like members, as well as of novel tool means for carrying into effect said method, being characterized by a more favorable metal flow or displacement during welding, compared with the previous welding techniques and tools, respectively, whereby to in turn result in a substantially reduced upsetting or welding pressure as well as in reduction of size and cost of the welding apparatus.

According to the known methods of welding wires by cold pressure welding, it was necessary, due to the design of the welding tools used, that the interface or weld area was practically at right angles to the axis of the wires, whereby to limit the weld area and, in turn, the weld strength by the diameter or cross-section of the wires being welded.

Accordingly, another object of the present invention is the provision of an improved method of and means for the cold pressure butt welding of wires or the like members by which the weld area is substantially increased, compared with the previous circular interface, whereby to result in a joint of increased efficiency or strength for a given size or diameter of wires being welded.

Finally, a drawback inherent in the previous cold pressure wire welding techniques is due to the fact that the ring-shaped welding flash resulting from the displaced metal, even after severance from the welded wires, remains locked with or threaded upon the wires, whereby to necessitate a separate cutting or splitting operation for the complete removal of the flash, as required in connection with practical wire processing operations. A major application of the invention is its use in connection with wire winding and unwinding operations involving the processing of wires of considerable lengths, whereby failure to remove the flash, through inadvertence or other causes, may result in considerable difficulties, if not a complete breakdown of the winding machines or other manufacturing or processing devices.

Accordingly, yet another object of the invention is the provision of an improved method or technique of cold pressure butt welding wires or the like members, whereby the normally closed or ring-shaped welding flash is automatically split into two parts during welding, to result in the formation of separate flash sections which may be removed readily and instantly, and without any cutting or splitting operation.

The invention, both as to the foregoing and ancillary objects as well as novel aspects thereof, will be better understood from the following detailed description, taken in conjunction with the accompanying drawings forming part of this specification and in which:

FIG. 1 illustrates in more or less schematic manner a known welding tool assembly for the butt welding of wires by cold pressure welding, the tool parts being shown in the position prior to welding;

FIG. 2 shows a pair of welded wires obtained by the use of a tool according to FIG. 1;

FIG. 2A is a side view taken on line 2A—2A of FIG. 2;

FIG. 3 shows a tool assembly for the butt welding of wires being similar to FIG. 1 but embodying the improvements of the present invention, the parts of the tool being shown in the position prior to welding;

Like reference characters denote like parts throughout the different views of the drawings.

Figure 4:
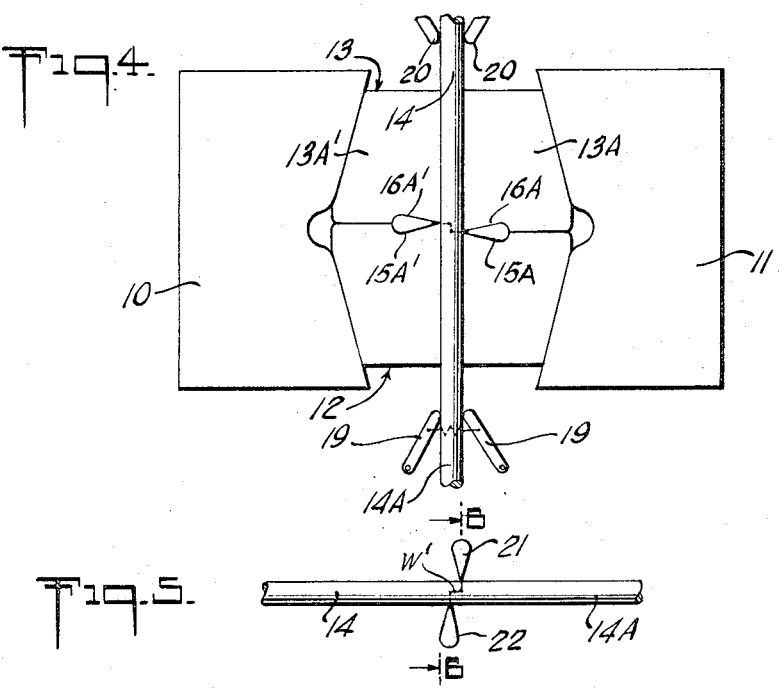
FIG. 4 shows the tool according to FIG. 3 with the parts in the position after welding.

With the foregoing objects in view, the invention, according to one of its aspects, involves the provision of a new and improved technique or method of butt welding wires or the like attenuated workpieces comprising essentially the steps of grasping or clamping a pair of wires to be welded by die means inwardly of the end faces of the wires, feeding the wires into contacting or abutting engagement and subjecting the butted wires to endwise or upset pressure through said die means and by the aid of suitable pressure applying means (hand press, pneumatic press, etc.) in such a manner as to create an interfacial metal flow substantially radially outwardly of the wires and to result in an initial substantially ring-shaped welding flash by the displaced metal, in the manner similar to known wire welding operations of this type. However, in contrast to the known methods and in accordance with the improvements of the present invention, the metal is further displaced, while continuing the pressure application, in an axial direction in addition to the radial metal flow, in such a manner as to cause the metal of one half-section of the initial ring-shaped flash to flow in one axial direction in respect to the wires, and to cause the metal of the other half-section of said flash to flow in the opposite axial direction, the upsetting pressure being continued until effecting a complete separation of the flash into two diametrically opposed sections and joining of the wires in a solid-phase butt weld joint or bond.

There is thus obtained by the use of the invention a final weld joint having a pair of separate and axially displaced welding or upset flashes or flash sections projecting diametrically from the welded wires and which can be removed instantly and readily without requiring a cutting or splitting operation. In other words, the ring-shaped welding flash obtained in connection with the conventional welding techniques is automatically split or separated, by the improved technique, into two parts during the welding operation, each of which parts can be removed independently in a simple manner.

Furthermore, splitting of the flash, or routing of the displaced metal flow into a pair of preferred (axial) directions shortly after the initiation of the welding or pressure application, results in a considerable reduction of the resistance offered to the displaced metal as a result of the upsetting operation. This, in turn, enables a reduction of the size of the pressure tools and cost of the welding apparatus for wires of a given size or diameter.

Besides, the composite metal flow in both radial and axial directions results in a substantial increase of the interfacial weld area, the latter taking the form of a three-dimensional surface having an S-shaped cross-section, as compared with the two-dimensional circular weld area, at right angle to the wire axis obtained in accordance with conventional welding techniques. This, in turn, results in a substantial increase of the efficiency or strength of the weld or joint obtained by the invention, as will become further apparent as the description proceeds.

In carrying into effect the invention, the composite radical and axial metal flow during welding and splitting of the initial ring-shaped welding flash being formed is achieved, according to one embodiment of the invention, in a simple and effective manner by the provision of a pair of split welding dies for the grasping or clamping of the wires, each of said dies in turn comprising a pair of die sections having mating surfaces formed with grooves or recesses for the reception and clamping of the wires to be welded. The faces of the two sections of each die adjoining the projecting wire ends are displaced in the axial direction, in such a manner as to cause the faces of the sections of one die to be equally spaced from the opposed faces of the section of the other die at all the relative spacing distances between the dies during welding. In other words, the die faces according to the present invention have a stepped configuration, whereby to result in an axial flow distribution of the displaced metal into two streams or portions and separation of the flash being formed into two sections, in the manner as will be further understood from the following detailed description in reference to the drawings.

The steps in the die faces may be either parallel to the dividing plane of the split die sections, whereby to result in different size die sections, in the manner shown by the drawings, or alternatively the steps in the die faces may be at right angles to said plane in which case the sections of both dies will be of the same size and configuration.

Referring more particularly to FIG. 1, there is shown schematically and by way of example a known tool assembly for the butt pressure welding of wires comprising a pair of welding die actuating blocks or members 10 and 11 arranged with their V-shaped inner faces 10A and 11A opposed to one another and mounted for rectilinear movement toward and away from one another and in the direction of the symmetry axis $x$—$x$. Members 10 and 11 may be guided in any suitable manner, such as by means of a pair of parallel guide plates 10B and 11B forming part or being secured to the frame of the tool. Disposed between the members 10 and 11 are a pair of split wire gripping dies 12 and 13 each comprising two die sections 12A and 13A and having slanting faces 12B and 13B, respectively, engaging and cooperating with the faces 10A and 11A of the blocks 10 and 11, in the manner to be described in greater detail presently. The mating surfaces of the die sections 12A and 13A are formed with grooves or recesses 12C and 13C providing a bore in the engaged or closed position of the dies for the reception and grasping of the end portions of a pair of wires 14 and 14A or the like workpieces to be welded. If the recesses 12C and 13C are of semi-circular configuration, the diameter of the resulting bore in the closed position of the dies is advantageously somewhat less than the diameter D of the wires in order to ensure a firm grip on the wires and to prevent slipping during welding. Alternatively, the recesses may be of square configuration to enable wires of varying diameter to be welded by means of a single set of welding dies.

The opposed faces 12D and 13D of the die sections 13A and 12A are formed at the points of emergence of the wires 14 and 14A from the dies with circular or ring-shaped recesses or welding cavities 15 and 16, respectively, which serve to accommodate the displaced metal during upsetting and welding of the butted ends of the wires, in such a manner as to result in a radial and ring-shaped welding flash 18, FIG. 2, as the end of the welding operation. The die sections 12A and 13A may be resiliently urged outwardly against the faces 10A and 11A of the blocks 10 and 11 by the aid of a pair of compression springs 17 and 17A and the dies may be similarly biased in a direction away from one another by further springs (not shown) being at right angles to the springs 17 and 17A. As a consequence, the tool will be urged to the starting position shown in FIG. 1, in the absence of any welding or upsetting pressure being applied to the blocks 10 and 11.

The wires inserted in the recesses 12C and 13C are positioned with the abutting ends projecting by a predetermined distance $d$ from the die faces 12D and 13D, said projecting distance advantageously being equal to 0.75 to 1.25D. In this manner upset buckling or crumbling of the wires is prevented and the metal displaced by each wire during welding is equal to that of a wire length of 0.75 to 1.25 times the wire diameter.

In one operation, as pressure is applied, by the aid of a suitable hand, pneumatic, or the like pressure applying device, to the blocks 10 and 11 in the direction indicated by the arrows A and B, the die sections 12A and 13A are at first pressed against the wires 14 and 14A to be firmly gripped, whereupon continued pressure application will result in the displacement of the dies 12 and 13 from the initial or starting position shown in the inward direction or towards one another, as indicated by the arrows C and E, against the upsetting resistance of the butted wire ends. As a consequence, the ends of the wires are upset and welded, to result in a solid-phase welding joint upon engagement of the die faces 12D and 13D acting as stops or abutments controlling the extent of the upsetting, in a manner well understood by those skilled in the art. Upon subsequent release of the welding pressure, the dies 12 and 13 are returned to the starting position, FIG. 1, by the action of the springs 17 and 17A, the latter being preferably assisted by additional biasing springs operatively associated with the pressure applying tool or mechanism. The welded wires, FIG. 2, may then be removed from the tool and the welding flash 18 separated from the wires, to provide a smooth joint across the substantially circular interface or weld area W being at right angles to the wire axis. By the design of the welding cavities 15 and 16 in the manner shown, that is, with the depth thereof increasing gradually from zero at the point of emergence of the wires from the dies, a flash 18 of substantially triangular cross-section is obtained which can be readily and instantly severed from the wires on account of the point-like connection with the wire surface.

While the flash 18, FIG. 2, can thus be simply severed from the wire surface, its complete removal requires a further operation by splitting or cutting the ring formed by the closed flash, as more clearly shown in FIG. 2A. While the separate operation is in itself undesirable or objectionable from both an operational and economical point of view, failure to completely remove the flash from the welded wires, due to inadvertence or other causes, may result in serious consequences, especially where the welding tool is used in connection with wire processing handling continuing lengths of wire.

The improved die construction and welding technique according to the present invention substantially eliminates the previous drawbacks and difficulties, while at the same time resulting in other desirable advantages, as described in the following in reference to FIG. 3 which shows a tool assembly similar to FIG. 1 but embodying the improvements of the present invention. Essentially, FIG. 3 differs from FIG. 1 by the stepped construction of the dies 12 and 13, that is, by the split die sections 12A and 12A' of the die 12 and by the split die sections 13A and 13A' of the die 13 being spaced by different distances from the ends of the respective wires 14A and 14 gripped by said dies, in such a manner that the distances between the opposed die faces 12D, 13D and 12D', 13D' remain the same in all relative positions of the dies and step of one die engages in the step of the other die in the closed die position, FIG. 4.

In other words, in the embodiment shown the die sections 12A and 12A' have a different dimension in the axial direction, the distance between the faces 12D and 12D' being about one fourth to one half of the normal projecting length of the wires from the dies, or diameter D, respectively. This distance is represented by $y$ in FIGURE 3. The same design consideration applies to the die sections 13A and 13A' and the die faces 13D and 13D', respectively.

In a tool according to FIG. 3, as the dies 12 and 13, after gripping of the wires 14 and 14A by the pressure applied to the blocks 10 and 11 in the direction of the arrows A and B, approach one another, as indicated by the arrows C and E, the ends of the wires are at first upset, to result in an initial ring-shaped welding flash, in the manner described in reference to FIG. 1. At the end of the initial limited upset, that is, upon the faces 12D' and 13D, being closest to the butted ends of the wires, engaging or abutting against the flash being formed, the metal of one half-section of the hitherto ring-shaped flash is additionally displaced in one direction axially of the wires, while the metal of the other half-section of the flash is additionally displaced in the opposite axial direction, in such a manner as to result in the diversion of the metal flow into two partial streams and splitting of the flash into two separate parts or sections upon reaching the final or closed position of the dies, FIG. 4, and welding of the wires by the action of the composite radial and axial metal flow.

Figure 5:
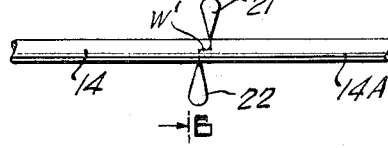
FIG. 5 shows a pair of welded wires obtained by use of the tool according to FIGS. 3 and 4.

FIG. 5 shows the finally welded wires obtained by use of the tool according to FIG. 3 with the two separate flash sections 21 and 22 being displaced axially for easy and instant removal without any separate splitting or cutting operation. An added advantage of the technique described, or use of the welding tool according to the invention, is due to the fact that, as a result of the metal flow of the separate half-sections of the initially ring-shaped flash in different preferred axial directions, the separate or split flash sections 21 and 22 assume a restricted and radial shape or configuration, FIG. 6, in place of a pair of semi-circular flashes as might be expected. This involves the further advantage of a substantially decreased resistance to the outward (radial) metal flow, whereby to, in turn, result in a considerable reduction of the required upsetting or welding pressure, and reduced size and cost of the welding tools.

Finally, the invention has the important advantage of a substantial increase of the interfacial or weld area as a result of the composite metal flow in both radial and axial directions. In other words, there is obtained a three-dimensional weld area substantially S-shaped cross-sections, as shown at W' in FIG. 5, compared with the conventional two-dimensional or interface W at right angles to the wires as obtained by use of the known techniques or tool constructions according to FIG. 1. The increased weld area, in turn, results in a corresponding increase of the efficiency or strength of the weld obtained by the use of the technique and improved welding tool according to the invention.

While the technique according to the invention of producing a split flash upon welding may be utilized in connection with welding by a single upsetting operation, where the precleaned and abutting ends of the wires must be positioned initially with the proper and equal spacing distances $d$ from the end faces of the dies, as shown in FIG. 1, to result in welding after a single upset, the invention is specially suited for use in connection with multiple upset welding referred to hereinabove, in which case pre-cleaning and accurate positioning of the wires prior to welding is less critical or may be dispensed with entirely, in such a manner as to greatly simplify the welding operations and use of the welding tool, or to enable operation without any special skill or training.

Thus, in FIG. 3 the wires 14 and 14A may be initially positioned in the dies 12 and 13 without any pre-cleaning and regard as to any special position, that is, with the ends of the wires being either in contact or separated from one another, and/or having any projecting lengths or configuration (straight, bent, etc.). In such a case, operation of the welding dies through a predetermined number of upsetting or pressure cycles will result in the wires being at first operated into abutting contact (provided the wires are initially separated) and upset in multiple steps until obtaining a final satisfactory solid-phase welding bond of the type shown in FIG. 5. A pre-requisite for such a multiple upset welding technique is the restraining of the wires against slipping or rearward movement during the intervals between successive upsets, or during opening and retracting of the dies and regripping of the wires at points outwardly of the preceeding gripping points. Simple tool means to achieve this aim may consist in the provision of a pair of spring-urged restraining plates 19 pivoted at one end and arranged with their opposite rounded ends resiliently engaging the opposite sides of the wire 14A by the action of a suitable biasing spring (not shown), as indicated by the arrows E in the drawing. The restraining plates 19, forming a one-way clamping device by pointing in the direction of the die 12, act to allow the wire 14A to be fed to the tool for upsetting and welding in the manner pointed out, but to restrain the wire against movement in the opposite or outward direction, in the manner described in greater detail in the copending application Ser. No. 355,350. A similar one-way clamp comprised of plates 20 is provided for the restraining of wire 14.

Figure 6:
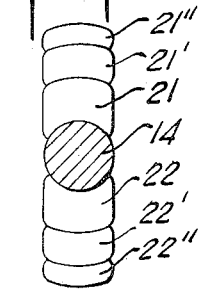
FIG. 6 is an enlarged section taken on line 6—6 of FIG. 5.

FIG. 6 shows the multiple welding flash obtained as a result of a triple upset by the use of a tool according to FIG. 3. As will be seen, the diametrical flash sections, each comprising the initial portions 21 and 22 resulting from the first upset, are followed by secondary upset portions 21, 21'' and 22', 22'', respectively, as a result of the subsequent upsetting operations. In practice, it has been found that about four to five upsets will result in the substantial removal of the impurities from the interface or weld area and, in turn, in the formation of an efficient and reliable solid-phase weld at the substantially S-shaped weld area W', FIG. 5. As will be understood, the multiple upset technique is especially suited for the welding of relatively thin and flexible wires which it is difficult to pre-clean or position properly, to result in a weld after the first upsetting operation. Besides, the increased weld area and strength of the weld obtained by the use of the invention assumes a special importance in the welding of wires or the like workpieces of relatively small cross-sectional dimension.

Figure 7:
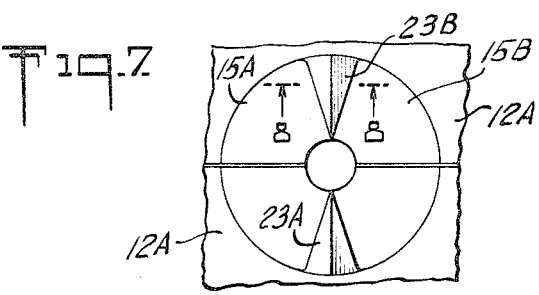
FIG. 7 is a front view of one of the welding dies of FIG. 1, showing a modification for carrying into effect of the invention.
Figure 8:
FIG. 8 is a partial sectional view taken on line 8—8 of FIG. 7.

In the foregoing there has been described an improved wire welding technique and tool to produce a split flash during welding in an effort to facilitate the removal of the flash at the end of a welding operation and to provide a smooth joint not exceeding the diameter of the wires. An alternative method and tool means to obtain a split flash upon welding is shown by FIGS. 7 and 8 involving the splitting of the flash radially rather than axially as in the case of the previously described embodiment. For this purpose, the welding cavity of the die sections 12A, FIG. 1, is divided into two parts 15A and 15B FIG. 7, by the provision of a pair of separating walls or cutters 23A and 23B, at right angles to the mating surfaces of the die sections. Again, the flash in the final welding position will be split into two diametrically opposed parts which can be removed readily and instantly and without any special tools, or skill. Similar cutters may be provided in the cavity 16 of the die 13.

While in FIG. 7 the weld cavity is shown interrupted by two cutters or separating walls 23A and 23B, a single separator may be sufficient for the splitting of the flash to enable its easy removal, as will be readily understood.

In the foregoing, the invention has been described in reference to specific illustrative embodiments or steps. It will be evident, however, that variations and modifications, as well as the substitution of equivalent parts and steps for those shown and described for illustration, may be made in accordance with the broader purview and spirit of the invention, as set forth in the appended claims. The specification and drawings are accordingly to be regarded in an illustrative rather than in a restrictive sense.

I claim:

1. A method of cold pressure welding the ends of wires and the like workpieces comprising the steps of
    (1) gripping the end portions of a pair of wires by die means inwardly of the end faces of the wires so that the end faces of said wires are in abutting relationship,
    (2) subjecting the butted wires to endwise pressure through said die means, to force said end faces together and to create an interfacial metal flow substantially radially of the wires and to thereby produce an initial ring-shaped upset flash by the displaced metal extending outwardly from the wires,
    (3) displacing, while continuing the upset pressure, the metal of one half-section of said flash in one direction axially of said wires and displacing the metal of the other half-section of said flash in the opposite axial direction, and
    (4) continuing said pressure until effecting a complete axial separation of said flash sections and joining of said wires in a solid-phase welding bond at an interfacial area of substantially S-shaped configuration.

2. A method of cold pressure welding wires as claimed in claim 1, the axial displacement of said flash sections being commenced after upsetting a length of said wires of the order of one quarter to one half of the diameter of the wires.

3. A method of cold pressure welding wires as claimed in claim 1, including the steps of releasing and re-gripping said wires at points inwardly of the first gripping points, and subjecting the wires to a series of successive multiple upsetting operations following the first upset.

4. A method of cold pressure welding wires as claimed in claim 1, including the steps of progressively restricting the width of the flash sections being formed at the points of emergence from the wires from a maximum at the starting position to substantially zero in the final welding position of the dies.

5. A method of cold pressure welding the ends of wires and the like workpieces comprising the steps of
(1) gripping the separate peripheral half-sections of the end portion of a first wire by split die means at points inwardly of and at different spacing distances from the end face of said first wire,
(2) gripping a second wire in the maner defined in step (1) with the end face of said second wire in face to face relationship with the end face of said first wire,
(3) operating the wires into abutting relation and subjecting the butted wires to endwise pressure through said die means, to force said end faces together and to create an interfacial metal flow at first substantially radially of the wires and unimpeded by said die means, and subsequently both radially and axially in one direction for one half of the displaced metal and both radially and axially in the opposite axial direction for the other half of the displaced metal by cooperation with said die means, and
(4) continuing said pressure until joining said wires in a solid-phase welding bond at the interfacial area with the displaced metal forming a pair of separate axially displaced partial welding flashes projecting diametrically from the welded wires.

6. In a method of cold pressure welding wires as claimed in claim 5, including the steps of progressively restricting the widths of said partial flashes at the points of emergence from the wires from a maximum at the starting position to substantially zero in the final welding position of the wires.

7. A method of cold pressure welding the ends of wires and the like workpieces comprising the steps of
(1) gripping the end portions of a pair of wires by die means inwardly of the end faces of the wires so that the end faces of said wires are in abutting relationship,
(2) subjecting the wires to endwise pressure through said die means, to force said end faces together and to create an interfacial metal flow substantially radially of the wires and to thereby produce an initial ring-shaped upset flash by the displaced metal extending outwardly from the wires,
(3) displacing, while continuing the upset pressure, the metal of one half-section of said flash in one direction axially of the wires and displacing the metal of the other half-section of said flash in the opposite axial direction, and
(4) progressively resticting during the pressure application the widths of said flash sections at the points of emergence from the wires, to result in the joining of the wires in a solid-phase welding bond by the interfacial metal flow and formation of a pair of separate axially displaced partial welding flashes extending diametrically from the welded wires upon said flash width approaching zero in the final welding position of the dies.

8. A method of pressure welding wires as claimed in claim 7, the axial displacement of said flash sections being commenced after upsetting a length of the wires of the order between one quarter and one half of the diameter of the wires.

9. A method of cold pressure welding wires as claimed in claim 7, including the steps of releasing and regripping said wires at points inwardly of the first gripping points, and subjecting the wires to a series of successive multiple upsetting operations following the first upset.

10. Welding apparatus for the joining of the ends of wires and the like workpieces by cold pressure upset welding comprising in combination:
(1) a pair of opposed welding dies mounted for rectilinear movement towards and away from one another,
(2) each of said dies comprising means for gripping a wire to be joined, said means for gripping the wire in each of said dies being in axial alignment so as to effect upsetting and welding of the butted ends of wires held by said gripping means by forcefully operating said dies towards one another,
(3) one half of each of said opposed dies having an end face which is displaced from an end face of the other half of said die in the direction in which said opposed welding dies are mounted for movement such as to cause both the resultant partial faces of one die to be equally spaced from the opposed partial faces of the other die in all relative positions of the dies.

11. In welding apparatus as claimed in claim 10, the faces of said dies being provided with welding cavities adjoining the point of emergence of the wires therefrom, to accommodate the upset metal displaced during welding, the opposed die faces engaging one another in the final welding position of the dies.

12. Welding apparatus for the joining of wires and the like work-pieces by cold pressure upset welding comprising in combination:
(1) a pair of split opposed welding dies each comprising a pair of die sections having mating surfaces provided with grooves, to provide apertures for the gripping of a pair of wires to be welded, the die sections of one welding die having end faces which are in face to face relationship with the end faces of the die sections of said welding dies,
(2) means to move said dies in a direction towards and away from one another, to effect upsetting and welding of the butted ends of the wires projecting from said dies by forcefully moving said dies together,
(3) the end face of one section of each die being relatively displaced in the direction of movement of said dies from the end face of the other section of each die, the end faces of the sections of one die being equally spaced from the opposed end faces of the sections of the other die.

13. In welding apparatus as claimed in claim 12, the end faces of said die sections being provided with cavities adjoining the points of emergency of the wires therefrom, to accommodate the upset metal displaced during welding, and the end faces of opposed die sections engaging one another in the final welding position.

No references cited.

JOHN F. CAMPBELL, *Primary Examiner.*

M. L. FAIGUS, *Assistant Examiner.*